United States Patent
Sussman

(10) Patent No.: US 7,027,990 B2
(45) Date of Patent: Apr. 11, 2006

(54) SYSTEM AND METHOD FOR INTEGRATING THE VISUAL DISPLAY OF TEXT MENUS FOR INTERACTIVE VOICE RESPONSE SYSTEMS

(76) Inventor: Lester Sussman, 9213 Bulls Run Pkwy., Bethesda, MD (US) 20817-2403

( * ) Notice: Subject to any disclaimer, the term of this patent is extended or adjusted under 35 U.S.C. 154(b) by 793 days.

(21) Appl. No.: 09/976,656

(22) Filed: Oct. 12, 2001

(65) Prior Publication Data

US 2003/0074198 A1 Apr. 17, 2003

(51) Int. Cl.
*G10L 21/00* (2006.01)

(52) U.S. Cl. .............................. 704/270.1; 379/93.23; 340/905

(58) Field of Classification Search .............. 704/271.1, 704/270; 379/93.23, 93.17; 340/905
See application file for complete search history.

(56) References Cited

U.S. PATENT DOCUMENTS

| | | | | |
|---|---|---|---|---|
| 5,802,526 A | * | 9/1998 | Fawcett et al. .......... 707/104.1 |
| 5,912,952 A | * | 6/1999 | Brendzel ................. 379/93.25 |
| 6,014,090 A | * | 1/2000 | Rosen et al. ................ 340/905 |
| 6,091,805 A | * | 7/2000 | Watson .................... 379/93.17 |
| 6,493,428 B1 | * | 12/2002 | Hillier ....................... 379/67.1 |
| 6,560,320 B1 | * | 5/2003 | Paleiov et al. ........... 379/93.23 |

* cited by examiner

*Primary Examiner*—Susan McFadden
*Assistant Examiner*—Huyen X. Vo

(57) ABSTRACT

The present invention solves the serial nature of today's Interactive Voice Response (IVR) telephony menu systems, by means of visually "looking ahead" and in any direction in the nested audio IVR menus. Computer software in the telephone, or associated hardware, provides a graphical user interface that enables the user to navigate related IVR text menus that are displayed on the telephone. The present invention provides a variety of means to store, display, select and update associated text menus and other data with an IVR system. The various communication means include analog modems, broadband modems, and VoIP connectivity. The present invention provides the means to convert the audio IVR menus to text menus, as well as the means to download the associated IVR text menus from the Internet.

12 Claims, 4 Drawing Sheets

SYSTEM AND METHOD FOR INTEGRATING THE VISUAL DISPLAY OF TEXT MENUS FOR INTERACTIVE VOICE RESPONSE SYSTEMS

BACKGROUND OF THE INVENTION

Interactive Voice Response systems (IVR), i.e. as implemented in Dual Tone Multi-Frequency (DTMF) computer menu systems are in common use today to help in responding to telephone inquiries by people without the need for a human operator.

Even though IVR systems are better than being placed on-hold until an operator is available, because the system is serial in nature, it results in a great deal of frustration experienced by the user. The serial nature of today's IVR systems force the user to listen to the whole menu before making a choice and even then the user is not entirely sure that the selection is the correct one. If an incorrect selection is made, or the user did not hear the menu selection correctly, it is a difficult process to back out of the menu system and navigate to the needed part of the IVR menu system.

To solve the serial nature of today's IVR menu systems, the means to "look anywhere", i.e. to navigate the menu system easily in any direction is needed. Computer software systems provide menu systems in the Graphical User Interface (GUI) that enable the user to "look ahead" prior to making a selection. Software menu systems include nested menus in which sub-menus lead off from other menu options.

The challenge is to integrate the visual menus of a GUI with the DTMF menus. U.S. Pat. No. 6,091,805 by Watson describes an implementation of this integration of visual and voice DTMF menus. The current invention implements a similar system to the '805 patent, but uses a more flexible methodology and system.

BRIEF SUMMARY OF THE INVENTION

It is an objective of this patent to provide a method and system, which improves upon the current Interactive Voice Response (IVR) systems, that are implemented using touch-tone telephones and host computers, by providing visual menus of the audio IVR menus.

It is a further objective of the invention to provide the means whereby the audio menus provided by the IVR host computer are synchronized and hence compatible with the visually displayed menus.

It is a further objective of this patent to provide the means to download and store information pertaining to the telephone call being undertaken.

It is a further objective of this patent to provide various communications means to download the relevant IVR text menus and other information relating to the call.

It is another objective to provide both previously stored and real-time IVR text menus.

DETAILED DESCRIPTION OF THE INVENTION

Figure 1:
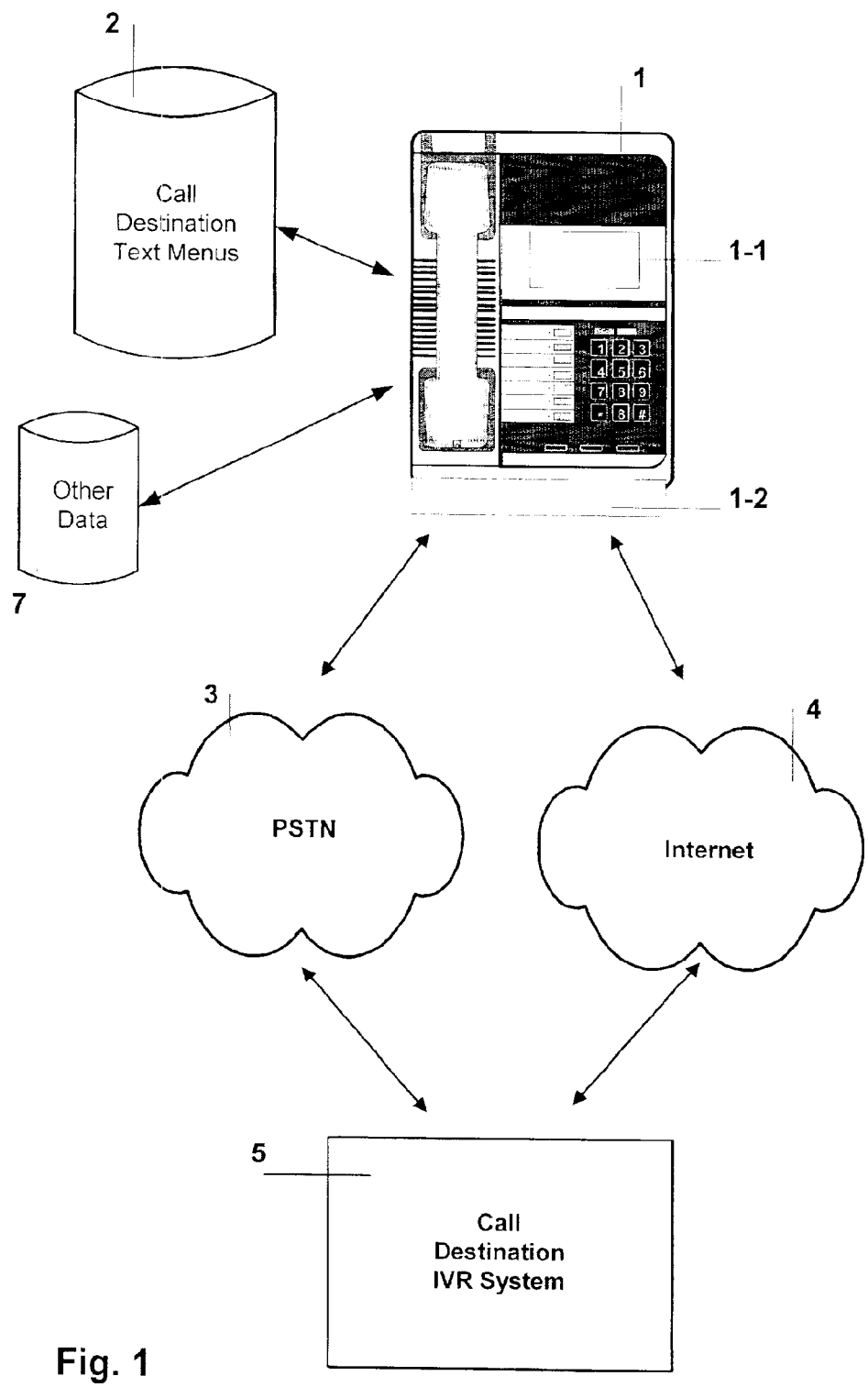
FIG. 1 is a schematic of the preferred invention's depiction of the invention using the Internet and the Public Switched Telephone Network (PSN) to interact with the IVR menu system.
Figure 2:
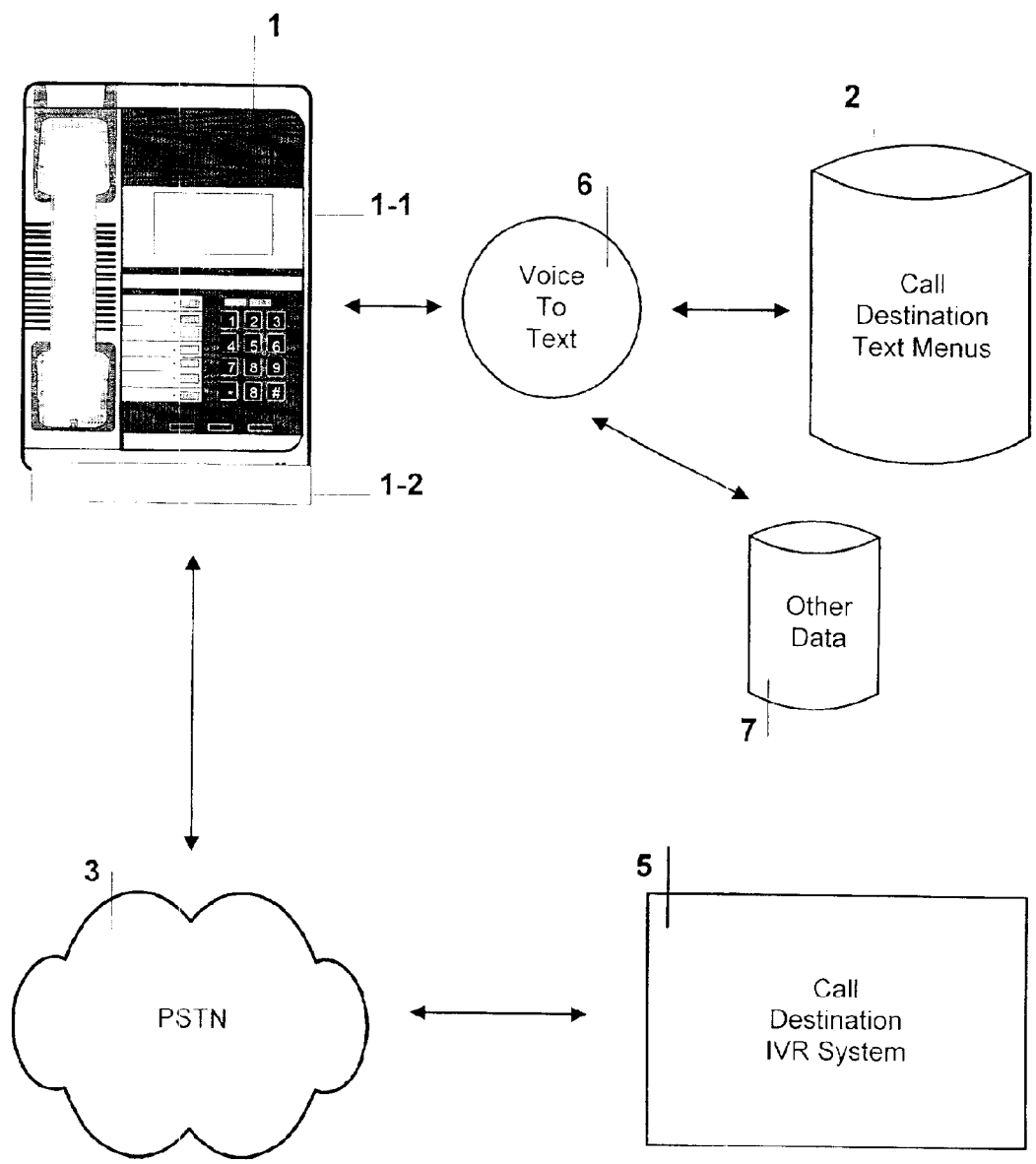
FIG. 2 is a schematic of the preferred invention's depiction of the invention using the PSTN only in conjunction with a voice-to-text translation system, in interacting with the IVR system.
Figure 3:
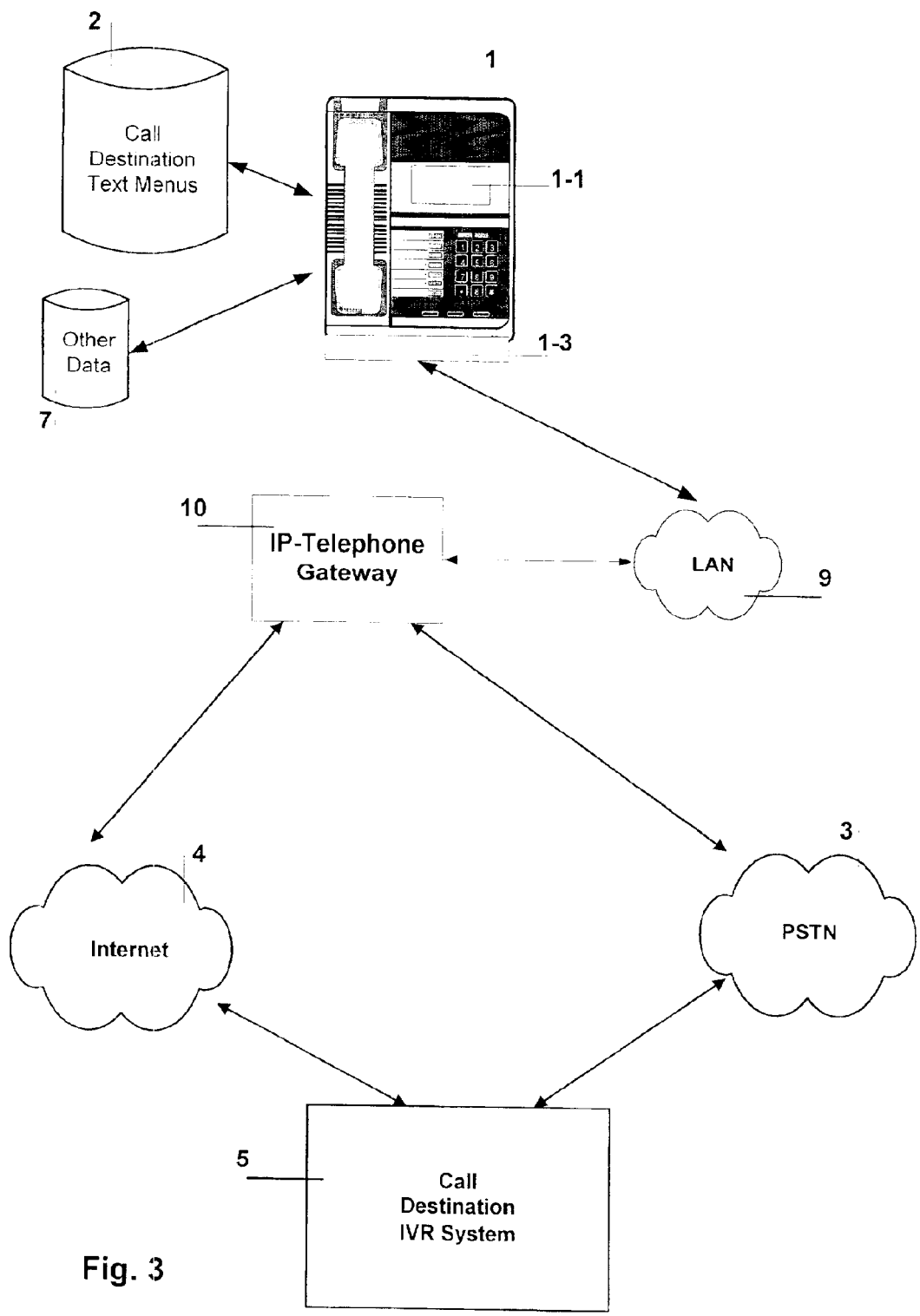
FIG. 3 is a schematic of the preferred invention's depiction of the invention using the using the integration of voice and data on the Internet and the Public Switched Telephone Network (PSTN) to interact with the IVR menu system.

This section describes three embodiments of the preferred invention, as well as common technologies used in all three embodiments:

1. Common technologies to all three of the embodiments are first described.
2. The basic embodiment consisting of analog components such as V.90 and V.92 modems as shown in FIG. 1—Analog Implementation.
3. The next technologically sophisticated implementation using broadband modem technology as shown in FIG. 1.—Broadband Implementation.
4. The next technologically sophisticated implementation using Voice-To-Text translation technology as shown in FIG. 2.—Analog-To-Digital Implementation.
5. The digital embodiment consisting of the convergence of voice and data using packetized technologies such as Voice Over IP (VoIP) as shown in FIG. 3—Digital Implementation.

1) Common Technologies

All three of the preferred embodiments of the present invention consist of a telephone 1 that has additional components over and above normal DTMF telephony components, which are listed below in section (1.1) Hardware.

(1.1) Hardware

All of the preferred embodiments consist of a computer enabled telephone 1, that has the DTMF telephony technology (i.e. a DTMF tone generator and detector); a display 1-1 on which the Call Destination Text Menus 2 are displayed; a modem 1-2 or network interface card 1-3 to connect to the Internet 4 (or other data network); computer memory to store Call Destination Text Menus 2 as text (e.g. a hard drive or Flash Memory); and computer processing technology to execute programs that store, display, selects and generates the appropriate DTMF tones to respond to a IVF System 5.

The preferred embodiment's hardware is integrated into the telephone 1, but does not exclude the implementation whereby the relevant hardware is physically separate from the telephone 1 and connected via a physical computer interface such as USB, RS232, wireless 802.11b, wireless Bluetooth, etc.

(1.2) Internet Connectivity

The preferred embodiment uses the Internet 4 to download the Call Destination Text Menus 2 to be stored in the telephone 1. Various communications technologies are available to connect to the Internet 4 including;

(a) Analog modems such as V.34, V.90, V.92, etc.;
(b) Broadband modems for ISDN, cable, xDSL, (i.e. various Digital Subscriber Line methods such Asymmetric and Symmetric) and satellite such as Hughes Networks' DirectPC;
(c) Local Area Network (LAN) technologies such as Ethernet and wireless 802.11b connecting to a dedicated access line (e.g. T1, T3, etc.) to the Internet 4 via a CSU/DSU telecommunications device. This access method is generally the domain of a company and not residential Internet 4 access.

Other networks could also be used besides the Internet 4. Direct modem dial-up into the Call Destination 5 computer via the Public Switched Telephone Network (PSTN) 3 can be used to download the Call Destination Text Menus 2. This method is similar to the electronic bulletin-board (BBS) technology that was prevalent prior to the popularity of the Internet 4. Furthermore on a private network, e.g. a Federal government department, the Call Destination Text Menus 2 could be stored in the private network's file server or Private Branch Exchange (PBX) server and either downloaded to the user's telephone 1, or accessed online from the PBX server.

(1.3) Software

Various operating systems (OS) are available to implement the various programs (software) that are needed to control the various implementations of the preferred embodiment of the invention. Examples of these OS are Microsoft Windows CE/PocketPC, Palm's PalmOS, Bluc-Cat's embedded Linux, FSMLabs' RTLinux, etc. The programs themselves could be written in a number of programming languages including C, C++, Java, etc. The Microsoft OS offers an application-programming interface (API) for telephony applications called TAPI (Telephony Application Programmers Interface). Sun Microsystems offers a similar API in Java called JTAPI (Java Telephony APT). Both of these APIs facilitates the communication and control of telephony hardware via a computer program. The preferred embodiment uses Linux and JTAPI in its various implementations, but it could as easily have used a Microsoft OS and TAPI.

(1.4) Pre-loading Call Destination Menus

The preferred embodiment implements a method whereby the IVR menus, i.e. Call Destination Text Menus 2 are pre-loaded into the telephone's Call Destination Text Menu 2 storage. This method saves time and implementation complexity during a call in which the user would have to wait for the IVF Call Destination Text Menus 2 to be downloaded each time a call is made. Information regarding where to locate updates of the Call Destination Text Menus 2 on the Internet 4 is also downloaded, i.e. the URL (Uniform Resource Locator) for the web site, e.g. www.irs.gov, ftp.irs.gov, etc.

The preferred embodiment uses a similar method described in Sussman's U.S. Pat. No. 5,483,586 patent "Electronic On-line Subscriber Telephone Directory", such that;

a) When the phone books are initially loaded into the phone's memory, where available (i.e. some phone numbers will not be associated with an IVR system and hence will not have DTMF menus) the Call Destination Text Menus 2 and their appropriate DTMF tones associations are loaded simultaneously. The preferred embodiment does not load audio tones but rather a representation of the menu's associated tone[s], but the storing of actual tones is possible as well in an embodiment of the present invention.

b) Updates to the entries in the phone books now include updates to any of the Call Destination Text Menus 2.

c) A version tag, e.g. a number, is stored together with each of the Call Destination Text Menus 2. This is used to ensure that the DTMF menu options that the user hears is the same as the text Call Destination Text Menu 2 that is stored in the user's telephone 1.

However, the invention differs from the '586 patent, such that the preferred embodiment of the invention allows the downloading of only the associated telephone number's IVR menus, rather than in association with a telephone number's directory information.

Figure 4:
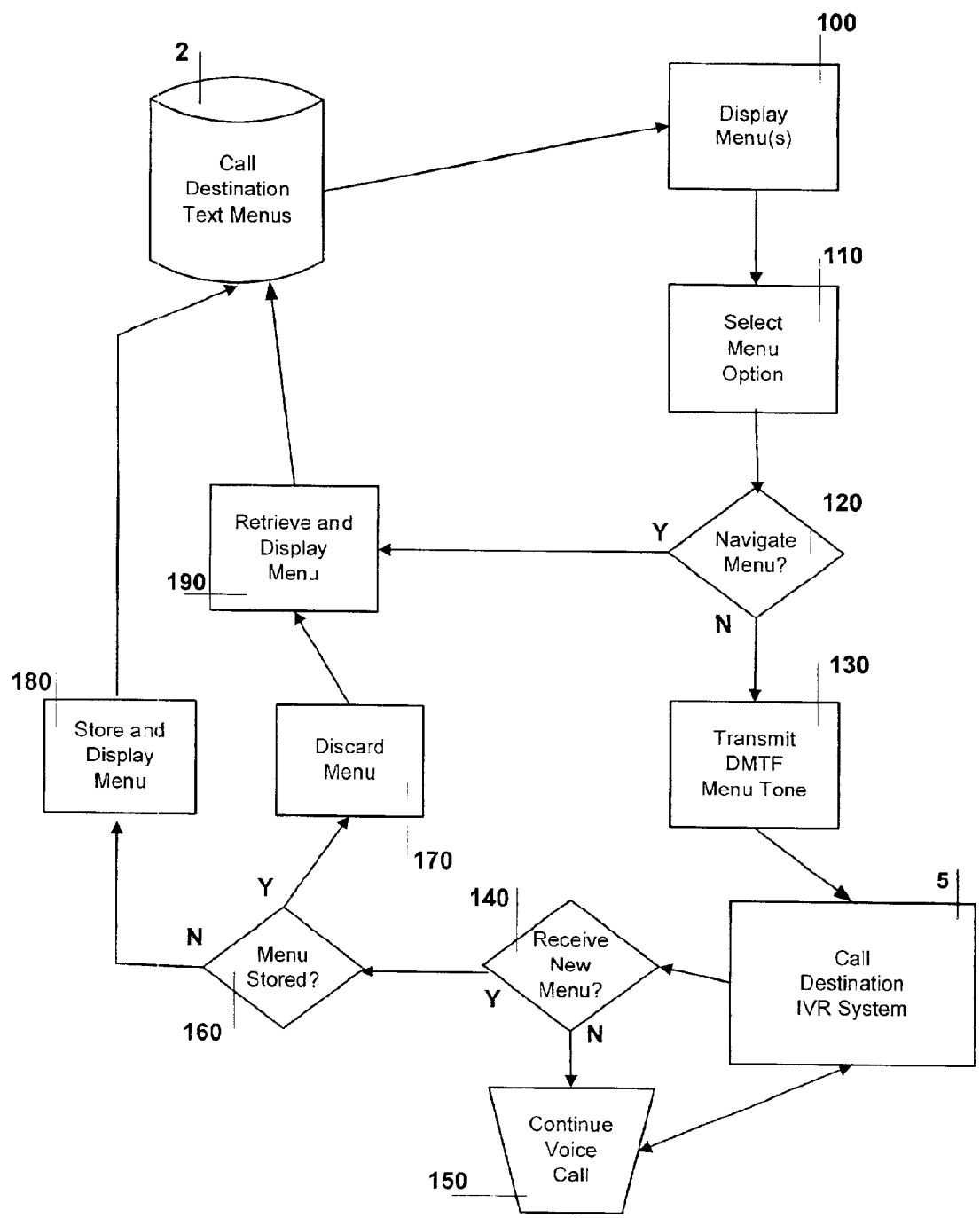
FIG. 4 is a flow chart of the general sequence of operations of the preferred embodiment of the present invention.

We now consider each of the above-mentioned embodiments of the invention separately, using the flow chart depicted in FIG. 4.

2) Analog Implementation

This implementation has a simple analog modem 1-2 connection to the Internet 4, e.g. by means of a V.90 modem (the preferred embodiment does not restrict this implementation to a V.90 modem).

With the user's telephone 1 connected to an analog modem 1-2, when the user dials the Call Destination telephone number on his phone 1, the computer hardware in the phone 1 uses the dialed number to search for any associated Call Destination Text Menus 2 that may be stored in phone's memory. When the phone 1 detects a carrier detect signal for the number dialed, it displays the associated menus 100. The invention could as easily display any menus prior to detecting a carrier signal for the phone number dialed. If no menu is available for the number dialed, a message stating such is displayed the telephone's display unit 1-1.

The following steps as depicted in FIG. 4 and described in Table 1 are now executed:

TABLE 1

| Step | Description of Action Taken |
|---|---|
| 1 | If a menu exists, the Call Destination IVR System sends a DTMF tone 130 that states the version number of the associated menus that it is about to play for the user. |
| 2 | The user's phone 1 converts the received DTMF menu's version number 140 to a digital number that the phone 1 checks to see if it is the same version number for the associated text menus 2 that it has stored in memory. |
| 3 | If the two versions are the same, then the stored Call Destination Text Menus 2 are displayed 190 on the user on the phone's display 1-1. |
| 3.1 | The situation in which the stored Call Destination Text Menu 2 and the audio menu transmitted from the Call Destination 5 are not of the same version number, the preferred embodiment simply displays this error on the display 1-1 and no text menu is displayed. The phone 1 logs this error in memory for later use to update the specific Call Destination Text Menu 2. Note that as long as the voice menu version and the stored text menu version are incompatible, this version of the preferred embodiment simply displays an error message on the display 1-1 and forces the user to listen to the various menu options until a menu option is selected in which the versions are the same. We are then back to step 3 in Table 1. |
| 4 | The user selects a menu option 110 on the display 1-1. |
| 5 | If the menu option 110 selected has other menu options associated with it, these are then displayed 190. |
| 6 | The phone 1 transmits a DTMF signal 130 associated with the selected menu option so that the user hears and sees the same menus options. |
| 7 | If nested menus exist, these are then displayed. This is the scenario in which the user is navigating the menus 120. |
| 8 | On the other hand if there are no more associated menus, i.e. sub-menus, then the phone 1 allows the user to continue the voice call 150. |

3) Broadband Implementation

This implementation is similar to the one described in the Analog Implementation section, but differs when the system discovers that the telephone's stored Call Destination Text Menus 2 and audio menus that the Call Destination IVR Systems 5 is playing on the phone are different or missing, i.e at step 3.1 in Table 1.

The advantage of a broadband Internet connection (e.g. via an ISDN, a cable or an xDSL modem 1-2) is that voice calls can be made simultaneously as to being connected to the Internet 4. This implementation uses the fact that data can be downloaded to the phone 1 whilst connected to a PSTN 3 voice call. The following additional steps are now executed in this implementation, i.e. from step 3 in Table 1 are executed as described in Table 2:

TABLE 2

| Step | Description of Action Taken |
| --- | --- |
| 3.1.1 | A program in the phone 1 retrieves the relevant URL that is stored in memory with the Call Destination Text Menu 2. |
| 3.1.2 | The program connects the phone 1 to the web site (URL) on the Internet 4 via the broadband modem 1-2. |
| 3.1.3 | The program first checks the version number of the URL's Call Destination Text Menu 2. |
| 3.1.3.1 | If the text menu version (i.e. step 3.1.3) is the same as the audio DTMF menu, the program downloads 140 the updates for the Call Destination Text Menu 2 whose version is out of synch with the audio menu and stores and displays 180 the new text menus. |
| 3.1.3.2 | On the other had, if the version is not the same, the text menu is discarded 170 and an error message is displayed to the user on the display 1-1 and a message is left at the URL reporting this error. |

3.1) Other Data Downloads

In this implementation it is also possible to simultaneously download and store any Other Data 7 that is associated with the call in progress. For example, if the user was calling his bank for account balances, these could be downloaded and stored in memory on the phone 1. The preferred embodiment uses a user initiation, i.e. menu prompt, to download any Other Data 7. The reason for this is that the preferred embodiment upholds user privacy and hence avoids the possibility of confidential information being unknowingly left in memory on the phone 1. Although not discussed further in the preferred embodiment, Other Data 7 downloads and storage could be encrypted using any available data encryption technology, e.g. SSL (Secure Sockets Layer) and PGP (Pretty Good Privacy) on the Internet 4 are fairly common practice today.

Other examples of Other Data 7 that can be downloaded include: restaurant menus; medical schedules and prescriptions; mail order catalogs; product licensing information; tickets for events and travel; billing information, etc.

4) Analog-To-Digital Implementation

This implementation is illustrated in FIG. 2. The primary difference between this implementation and the above two implementations, is the fact that specific voice (i.e audio) words received on the telephone 1 via the PSTN 3 are converted to electronic computer data (e.g. ASCII characters) via the Voice-To-Text 6 program stored in the phone 1. This implementation still uses the pre-loading of Call Destination Text Menus 2 as described in the above section (1.4) Pre-loading Call Destination Menus. The preferred embodiment does not exclude the possibility that Call Destination Text Menus 2 are converted to text on the fly, i.e. during the voice call.

Speech recognition technology is fairly common today in the information technology industry. Many patents have been granted to this class of technology including U.S. Pat. No. 6,292,769 ("Speech recognition apparatus and method") to Flanagan, et al. and U.S. Pat. No. 6,243,684 ("Directory assistance system and method utilizing a speech recognition system and a live operator") granted to Stuart et al. Various software products are commercially available such as Dragon Systems, Verbex Voice Systems and IBM's CallPath and DirectTalk.

Initially all of the associated Call Destination Text Menus 2 are pre-loaded into the phone 1 as described in the section (1.4) Pre-Loading Call Destination Menus. This implementation of the preferred embodiment of the invention applies to the situation in which the audio and text menus are of different version numbers, i.e. step 3.1 in Table 1. Once the control program in the phone 1 recognizes this situation any subsequent audio menus received, the Voice-To-Text 6 program converts any audio received IVR menus to text and stores and displays them as the Call Destination Text Menus 2. Today a common problem with Voice-To-Text 6 systems is being adaptable to handle all of the possible combinations of voice accents, etc. This problem is somewhat alleviated in the present invention, because it is the IVR Systems 5 that controls the voice that announces the various menu options and the number of manufacturers of this equipment is limited.

This implementation also allows Other Data 7 to be downloaded during a voice call 150. This implementation is described in section (3.1) Other Data Downloads, except that the Other Data 7 are received as audio data and are converted to electronic text (i.e. ASCII characters) by the Voice-To-Text 6 program. The converted data are stored in association with the telephone number that the user dialed and thereby can be retrieved and displayed at another time.

5) Digital Implementation

The convergence of voice and data is rapidly becoming commonplace today. This convergence is being implemented by converting voice to data packets, e.g. Voice-Over-IP (VoIP). The detailed description of the present invention will not discuss in detail the various technologies associated with VoIP. Faynberg, et al's book "Converged Networks and Services" is a good introduction to this technology.

In this implementation of the preferred embodiment, the invention considers the implementation in using Cisco's Catalyst 4224 IP Telephone Gateway and CallManager products in an office environment, but it obviously can be implemented in a residential environment as well.

In FIG. 3 an IP-telephone 1 is connected to a Local Area Network 9 (LAN) using a network interface card (NIC) 1-3 running the Internet Protocol (IP) suites. Both voice and data are transmitted via the NIC 1-3 onto the LAN 9. An IP-Telephone Gateway 10, e.g. the Cisco Catalyst 4224 is connected to the LAN 9. In summary, the IP-Telephone Gateway 10 channels voice data to the PSTN 3 by converting the voice packets to analog data, and channels data packets to the Internet 4.

Even though voice IP packets can be transmitted over the Internet 4, because of the inherent data transmission delays in the Internet 4, the preferred embodiment of the invention uses the PSTN 3 rather than the Internet 4 for voice traffic. In time, quality of service (QoS) and reliability for VoIP may improve to a comparable level as today's PSTN 3 voice circuit switched network. In this case the preferred embodiment would route VoIP traffic over the Internet 4.

We now consider how this implementation handles IVR. The Digital Implementation of the invention is very similar to the Broadband Implementation of the invention. At the heart of the similarity is the fact that a voice call and data transmission can be executed simultaneously in both implementations.

This implementation is similar to the one described in the Analog Implementation section, but differs when the system discovers that the telephone's stored Call Destination Text Menus 2 and audio menus that the Call Destination IVR Systems 5 is playing on the phone are different or missing, i.e at step 3.1 in Table 1. This implementation executes the additional steps detailed in Table 2, as in the Broadband Implementation.

In this implementation it is also possible to simultaneously download and store any Other Data 7 that is associated with the call in progress. Refer to the above section (3.1) Other Data Downloads as described in the Broadband Implementation.

What is claimed is:

1. A computerized interactive voice response system comprising:
    an interactive voice response host computer for providing audio menus;
    a source computer for providing text data associated with said audio menus;
    a user telephone;
    wherein said user telephone interfaces with an embedded computer having a display screen and having a first program to display visual menus on said user embedded computer display screen and wherein said user embedded computer is capable of operating independently and not in connection with said user telephone;
    an interface for connecting said user telephone, and said interactive voice response host computer, wherein said interface connects said user telephone to said interactive voice response host computer on a first communications network, enabling sending signals from said user telephone to said interactive voice response host computer;
    a modem attached to said user embedded computer for receiving said text data to display visual menus and other data on said user embedded computer display screen from said source computer;
    wherein said first communications network is a public switched telephone network;
    wherein said embedded computer has memory means to store said visual menus and other data;
    wherein said visual menus comprise said text data, said text data pre-stored in said memory, retrieved from said source computer prior to connecting to said interactive voice response host computer;
    wherein said first program in said user telephone embedded computer enables said user computer display screen to display said visual menus whenever a dialed telephone number has associated audio menus provided by said interactive voice response host computer;
    wherein said first program in said user telephone embedded computer provides navigation means to explore and select menu options in said visual menus prior to connecting to said interactive voice response host computer, transmitting said signals of said selection from said user telephone to said interactive voice response host computer after selecting said menu options;
    wherein said pre-stored visual menus stored in said embedded computer memory means, and said pre-stored visual menus reside on said source computer, accessible by said user telephone by means of said modem on said computer communications network; and
    said pre-stored text data, in said embedded computer memory means, comprise menu text data and location data of said source computer on said computer communications network.

2. The system of claim 1 further including means for ensuring that said displayed visual menus correspond to said audio menus provided, and providing means to log message in said memory if said visual menus and said audio menus do not correspond, to retrieve at a later time a correct version of visual menus from said source computer.

3. The system of claim 1 wherein said interface further includes means for converting signals from said user telephone embedded computer into tones to be received by said interactive voice response host computer, thereby enabling selection of menu items from an input device connected to said user telephone embedded computer.

4. The system of claim 1 wherein said modem is an analog modem, said computer communications network is the internet.

5. The system of claim 1 wherein said embedded computer has a control program capable of receiving notification of an update to said visual menus from said source computer by said computer communications network; retrieving said update from said source computer, on said computer communications network; and storing said visual menus update in said computer memory.

6. The system of claim 1 wherein said system has means to download from a second host computer, and to store other data associated with the telephone call prior to telephone call being made, said other data includes restaurant menus, medical schedules and prescriptions, mail order catalogs, product licensing information, tickets for events and travel and billing information.

7. A computerized interactive voice response system comprising:
    an interactive voice response host computer for providing audio menus;
    a source computer for providing text data associated with said audio menus;
    a user telephone;
    wherein said user telephone interfaces with an embedded computer having a display screen and having a first program to display visual menus on said user embedded computer display screen and wherein said user embedded computer is capable of operating independently and not in connection with said user telephone;
    an interface for connecting said user telephone, and said interactive voice response host computer, wherein said interface connects said user telephone to said interactive voice response host computer on a first communications network, enabling sending signals from said user telephone to said interactive voice response host computer;
    a computer network communications means attached to said user embedded computer for receiving data from said source computer to display said visual menus and other data on said user embedded computer display screen;
    a computer communications means whereby voice and data are transmitted and received on the said computer network communication means;
    wherein said first communications network is a public switched telephone network;
    wherein said embedded computer has memory means to store said visual menus and other data;
    wherein said visual menus comprise said text data, said text data pre-stored in said memory, retrieved from said source computer prior to connecting to said interactive voice response host computer;
    wherein said first program in said user telephone embedded computer enables said user computer display screen to display said visual menus whenever a dialed telephone number has associated audio menus provided by said interactive voice response host computer;
    wherein said first program in said user telephone embedded computer provides navigation means to explore and select menu options in said visual menus prior to connecting to said interactive voice response host computer, transmitting said signals of said selection from said user telephone to said interactive voice response host computer after selecting said menu options;

wherein said pre-stored visual menus stored in said embedded computer memory means, and said pre-stored visual menus reside on said source computer, accessible by said user telephone by means of said modem on said computer communications network; and said pre-stored text data, in said embedded computer memory means, comprise menu text data and location data of said source computer on said computer communications network.

8. The system of claim 7 further including means for ensuring that said displayed visual menus correspond to said audio menus provided, and providing means to retrieve, during said connection to said interactive voice response host computer, a correct version of visual menus from said source computer if said visual menus and said audio menus do not correspond.

9. The system of claim 7 wherein said interface further includes means for converting signals from said user telephone embedded computer into tones to be received by said interactive voice response host computer, thereby enabling selection of menu items from an input device connected to said user telephone embedded computer.

10. The system of claim 7 wherein said embedded computer has a control program capable of receiving notification of an update to said visual menus from said source computer by said computer communications means; retrieving said update from said source computer, on said computer communications means; and storing said visual menus update in said computer memory.

11. The system of claim 7 wherein said system has means to download from a second host computer, and to store other data associated with the telephone call during said telephone call being made, said other data includes restaurant menus, medical schedules and prescriptions, mail order catalogs, product licensing information, tickets for events and travel and billing information.

12. The system of claim 7 wherein the said computer network communications is a broadband network means, or an Ethernet network means, or a wireless 802.11b means, or a wireless Bluetooth means.

* * * * *